United States Patent
Qi (10) Patent No.: US 8,808,482 B2
(45) Date of Patent: Aug. 19, 2014

(54) PORTABLE MANUFACTURING METHOD FOR MANUFACTURING FLEXIBLE INSULATED DUCT

(75) Inventor: Weigang Qi, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 209 days.

(21) Appl. No.: 12/956,164

(22) Filed: Nov. 30, 2010

(65) Prior Publication Data

US 2011/0139289 A1    Jun. 16, 2011

Related U.S. Application Data

(60) Provisional application No. 61/287,007, filed on Dec. 16, 2009.

(51) Int. Cl.
| | |
|---|---|
| *B29C 63/06* | (2006.01) |
| *B65H 81/00* | (2006.01) |
| *F24F 13/02* | (2006.01) |
| *F16L 59/153* | (2006.01) |
| *B29D 23/00* | (2006.01) |
| *B29C 65/00* | (2006.01) |
| *B29C 53/50* | (2006.01) |
| *B29L 23/00* | (2006.01) |

(52) U.S. Cl.
CPC ........... *F16L 59/153* (2013.01); *B29C 66/9674* (2013.01); *B29C 66/91216* (2013.01); *B29C 2793/009* (2013.01); *B29C 53/50* (2013.01); *B29C 66/91212* (2013.01); *B29C 66/1122* (2013.01); *F24F 13/0218* (2013.01); *B29C 63/065* (2013.01); *B29D 23/001* (2013.01); *B29L 2023/225* (2013.01); *B29C 66/4322* (2013.01); *B29K 2995/0015* (2013.01); *B29C 66/919* (2013.01); *B29C 66/91221* (2013.01); *B29C 66/865* (2013.01); *F24F 2221/125* (2013.01)

USPC ........... 156/188; 156/184; 156/185; 156/187; 156/190; 156/193

(58) Field of Classification Search
CPC .... B29C 44/324; B29C 53/50; B29C 63/065; B29C 66/43; B29C 66/1122; B29C 65/00; F16L 59/153; F16L 59/022; F24F 13/0218; F24F 13/0263
USPC ......... 156/184, 185, 187, 188, 190, 193, 443, 156/477.1
See application file for complete search history.

(56) References Cited

U.S. PATENT DOCUMENTS

| | | |
|---|---|---|
| 3,607,496 A | 9/1971 | Kissell |
| 3,652,377 A | 3/1972 | Helmick |

(Continued)

OTHER PUBLICATIONS

Troughton, Michael J. Handbook of Plastics Joining—A Practical Guide (Second Edition). pp. 65-71. © 2008 by William Andrew Publishing.*

*Primary Examiner* — Katarzyna Wyrozebski Lee
*Assistant Examiner* — Carson Gross
(74) *Attorney, Agent, or Firm* — Calfee, Halter & Griswold LLP (57) ABSTRACT

A method of manufacturing flexible insulated duct includes wrapping a substantially flexible tubular core with a layer of insulation. A substantially flexible outer layer is wrapped about the layer of insulation such that longitudinal edges of the outer layer circumferentially overlap to define a longitudinally extending seam. The overlapping longitudinal edges of longitudinally extending seam in the outer layer are bonded together, thereby forming the flexible insulated duct. The flexible insulated duct is then cut to a discrete length and installed at a job site.

27 Claims, 3 Drawing Sheets

(56) References Cited

U.S. PATENT DOCUMENTS

| | | |
|---|---|---|
| 3,654,966 A | 4/1972 | Waksman |
| 3,817,804 A | 6/1974 | Helmick et al. |
| 3,950,213 A * | 4/1976 | Rejeski et al. ............... 156/461 |
| 3,976,530 A | 8/1976 | Callan |
| 4,235,063 A | 11/1980 | Paetz |
| 4,307,053 A | 12/1981 | Daws et al. |
| 4,310,585 A | 1/1982 | Shannon |
| 4,410,014 A | 10/1983 | Smith |
| 4,508,500 A | 4/1985 | French |
| 4,590,108 A | 5/1986 | Nippe |
| RE32,254 E | 9/1986 | Daws et al. |
| 4,777,086 A | 10/1988 | Madden et al. |
| 5,607,529 A * | 3/1997 | Adamczyk et al. ........... 156/143 |
| 5,947,158 A * | 9/1999 | Gross et al. .................. 138/149 |
| 6,000,261 A * | 12/1999 | Johnston .......................... 72/49 |
| 6,527,014 B1 | 3/2003 | Aubourg |
| 2002/0162599 A1 | 11/2002 | Aubourg |
| 2003/0188792 A1 | 10/2003 | Donnelly |
| 2004/0163724 A1 | 8/2004 | Trabbold et al. |
| 2007/0131299 A1 | 6/2007 | Kornbleet |
| 2008/0135157 A1 | 6/2008 | Donnelly |
| 2009/0133769 A1 | 5/2009 | Riley et al. |

\* cited by examiner

FIG. 7

PORTABLE MANUFACTURING METHOD FOR MANUFACTURING FLEXIBLE INSULATED DUCT

CROSS REFERENCE TO RELATED APPLICATIONS

This application claims the benefit of U.S. Provisional Application No. 61/287,007 filed Dec. 16, 2009, the entirety of which is incorporated by reference herein.

BACKGROUND OF THE INVENTION

Various embodiments of a method of manufacturing flexible duct are described herein. In particular, the embodiments described herein relate to an improved method of manufacturing flexible duct.

Flexible duct may be used in heating, ventilation and air conditioning systems to convey warmed or cooled air. To maximize energy efficiency, the flexible duct may be insulated. Accordingly, flexible insulation (also known as flexible duct media) may be used to insulate the flexible duct.

Such flexible insulated duct commonly includes a core of helical wire encapsulated in plastic film or other material, glass fiber insulation wrapped about the core, and an out jacket of plastic film. Known machines for manufacturing flexible insulated duct are typically large and bulky and produce flexible insulated duct in predetermined fixed lengths which are then compressed, packaged, and sent to the customers. Users of the flexible insulated duct must then cut the duct to a desired length, creating unusable scrap portions or lengths of the duct. It is desirable to provide an improved, more efficient method of manufacturing flexible insulated duct.

SUMMARY OF THE INVENTION

The present application describes various embodiments of a method and apparatus for manufacturing flexible duct. In one embodiment the method of manufacturing flexible insulated duct includes wrapping a substantially flexible tubular core with a layer of insulation. A substantially flexible outer layer is wrapped about the layer of insulation such that longitudinal edges of the outer layer circumferentially overlap to define a longitudinally extending seam. The overlapping longitudinal edges of longitudinally extending seam in the outer layer are bonded together, thereby forming the flexible insulated duct. The flexible insulated duct is then cut to a discrete length.

In another embodiment, the method of manufacturing flexible insulated duct in a vehicle-transportable flexible insulated duct manufacturing machine includes placing a flexible insulated duct manufacturing machine in a vehicle. The vehicle is transported to a location where a flexible insulated duct manufactured by the insulated duct manufacturing machine will be used. A substantially flexible tubular core is wrapped with a layer of insulation. A substantially flexible outer layer is wrapped about the layer of insulation, thereby forming the flexible insulated duct. The flexible insulated duct is then cut to a discrete length.

In an additional embodiment, a vehicle-transportable flexible insulated duct manufacturing machine included a vehicle and a source of substantially flexible tubular core, a source of insulation, and a source of substantially flexible outer layer within the vehicle. A first machine member wraps the insulation around a portion of the circumference of the core. A second machine member wraps the insulation into a substantially cylindrical shape about the core. A third machine member disposes the outer layer about the wrapped insulation such that longitudinal edges of the outer layer overlap to define a longitudinally extending seam. A source of heat directs heat at the longitudinally extending seam and bonds the overlapping longitudinal edges together, thereby forming the flexible insulated duct. A cutting member cuts the flexible insulated duct to a discrete length.

Other advantages of the method and apparatus for manufacturing flexible duct will become apparent to those skilled in the art from the following detailed description, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, improved methods and apparatus for manufacturing flexible insulated duct are disclosed. As used in the description of the invention and the appended claims, the word "flexible" is defined as capable of being flexed, bent, and/or axially compressed. The phrase "flexible insulated duct" is defined as any duct, configured for the conveyance of gas, in which at least a portion is flexible. The phrase "fibrous insulation" is defined any insulation formed from fibrous material. The terms "insulative value" and "R-value" are defined as describing a level of thermal resistance. The term "transportable" is defined as capable of being moved to and from a location where the flexible insulated duct will be manufactured and/or used.

The description and figures disclose an improved method of manufacturing flexible insulated duct in a vehicle transportable flexible insulated duct manufacturing machine. Generally, the flexible insulated duct includes an inner layer or core and an outer layer surrounding at least one layer of fibrous insulation. The fibrous insulation may have any desired thickness and density so as to achieve a desired insulative value or R-value. Transportability allows the user, such as a contractor, to quickly, easily and, conveniently manufacture a desired length of flexible insulated duct on a job site, thereby eliminating shipping time and cost, and waste associated with the short, unusable scrap portions cut from known pre-cut lengths of flexible insulated duct when such duct is cut at a job site to fit a particular job.

Figure 1:
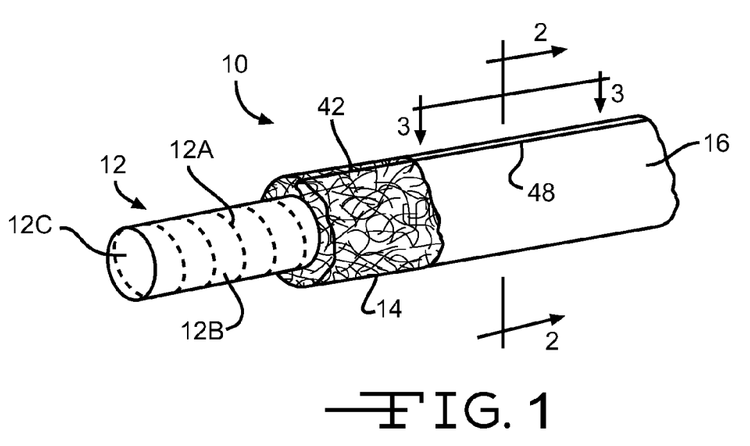
FIG. 1 is a perspective view, partially in section, of a portion of a flexible insulated duct manufactured according to the method of the invention.
Figure 2:
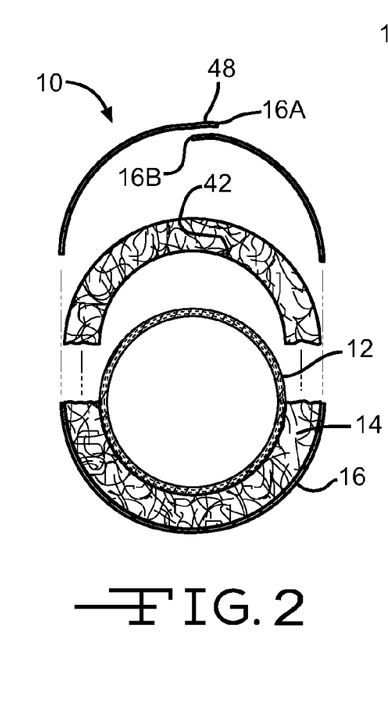
FIG. 2 is an enlarged cross-sectional view taken along the line 2-2 of FIG. 1.
Figure 3:
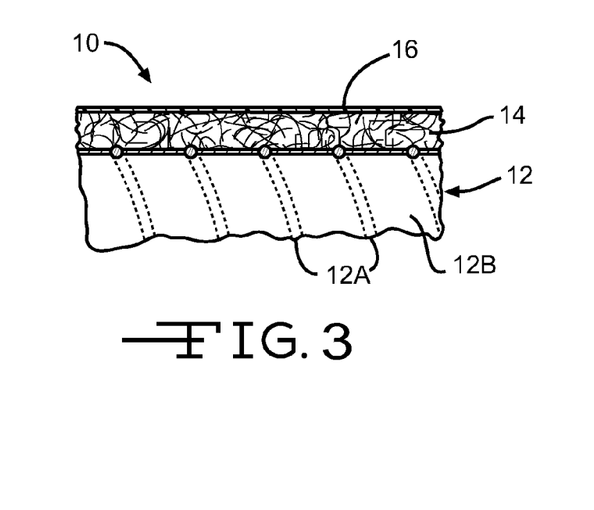
FIG. 3 is an enlarged cross-sectional view taken along the line 3-3 of FIG. 1.

Referring now to the drawings, there is shown at 10 in FIGS. 1 through 3, a portion of an exemplary embodiment of flexible insulated duct manufactured according to the method of the invention. The illustrated flexible insulated duct 10 is configured for use in heating, ventilation, and air conditioning systems to convey air, such as warmed or cooled air. The illustrated flexible insulated duct 10 includes an inner core 12, a layer of fibrous insulation 14, and an outer layer 16.

The flexible insulated duct 10 may have any desired diameter suitable to convey a desired volume of air in the environment in which the flexible insulated duct 10 will be used. In the embodiment illustrated in FIG. 1, the flexible insulated duct 10 has an inside diameter (ID) determined by the circumference of the core 12. It will be understood that the flexible insulated duct 10 may have any desired ID.

Referring again to FIG. 1, the inner core 12 is substantially flexible, substantially tubular, and has a desired cross-sectional shape. In the illustrated embodiment, the inner core 12 has a substantially circular cross-sectional shape which defines a flow channel 12C. The inner core 12 however, may have any other desired cross-sectional shape, such as oval, rectangular, and other geometric and non-geometric shapes.

The inner core 12 is further configured to provide a supporting structure for a layer of fibrous insulation 14, and the outer layer 16. In the illustrated embodiment, the inner core 12 includes a structural form 12A interconnected with a continuous tubular liner 12B. In the illustrated embodiment, the structural form 12A is a continuous wire spring or wire helix. The illustrated helix 12A is configured such that the individual coils of the wire spring or helix 12A are spaced apart along the length of the core 12. It will be understood that the helix 12A may be configured such that the coils have any desired diameter, are spaced any desired distance apart, and have any desired pitch. In the illustrated embodiment, the helix 12A is formed of spring steel. Alternatively, the helix may be formed of any other desired metal or non-metal.

The liner 12B of the inner core 12 is configured to maintain the structural form of the helix 12A, and also configured to provide an air seal and a barrier between the layer of fibrous insulation 14 and the flow channel 12C defined by the core 12. In the illustrated embodiment, the liner 12B is formed from vinyl film. Alternatively, the liner 12B may be formed from any other desired material, such as MYLAR® film, polyester film, metalized polyester film, plastic sheet, woven and coated fiberglass cloth or scrim, and other polymers, non-polymers, and fabrics. The inner core 12 may have any desired OD. In the illustrated embodiment, the OD of the inner core 12 is about 8.0 inches. Alternatively, the inner core 12 may have any desired diameter suitable for the environment in which the flexible insulated duct 10 will be used. For example, the OD of the inner core 12 may alternatively be within the range of from about 3.0 inches to about 24.0 inches. It will be understood however, that OD of the inner core 12 may be less than about 3.0 inches or more than about 24.0 inches.

Referring again to FIGS. 1 through 3, the layer of fibrous insulation 14 surrounds the inner core 12. The layer of fibrous insulation 14 is configured to provide insulation to the flexible insulated duct 10. The layer of fibrous insulation 14 may have any desired thickness and density so as to achieve a desired level of thermal resistance or R-value and any desired level of acoustic dampening. In the illustrated embodiment, the insulation 14 is fiberglass insulation formed in a roll. Alternatively, any other desired type of insulation material may be used. In the illustrated embodiment, the insulation 14 is about 1.0 inch thick. Alternatively, the insulation 14 may have any desired thickness required to achieve a desired R-value for the flexible insulated duct 10. For example, the insulation 14 may alternatively have a thickness within the range of from about 0.5 inches to about 2.0 inches. It will be understood however, that the thickness of the insulation 14 may be less than about 0.5 inches or more than about 2.0 inches. In the illustrated embodiment, the density of the fibrous insulation 14 is within the range of from about 0.75 pounds per cubic foot (pcf) to about 0.90 pcf. It will be understood however, that the density of the fibrous insulation 14 may be less than about 0.75 pcf or more than about 0.90 pcf.

The outer layer 16 is wrapped around the layer of fibrous insulation and defines a substantially tubular vapor seal around the layer of fibrous insulation 14. In the illustrated embodiment, the outer layer 16 is formed from polyethylene (PE). Alternatively, the outer layer 16 may be formed from any other desired substantially flexible material, such as plastic film, metalized plastic film, woven and coated fiberglass cloth or scrim, and other plastics, non-plastics, and fabrics. In the illustrated embodiment, the outer layer 16 is formed to have an ID substantially equal to the OD of the layer of fibrous insulation 14. Alternatively, the outer layer 16 may have any other desired ID.

Referring now to FIGS. 4 through 7, one embodiment of a machine for performing the method of manufacturing the flexible insulated duct 10 is shown generally at 20. The illustrated machine 20 includes a substantially horizontal platform 22 supported by a plurality of supports or legs 24. The machine 20 may include a first outwardly extending support member 26 (upwardly extending when viewing FIGS. 4 and 7) and a second outwardly extending support member 28 (upwardly extending when viewing FIG. 7), shown only in FIG. 7. The platform 22, legs 24, and support members 26 and 28 may be formed from any desired material, such as tubular steel or aluminum. Alternatively, any other desired metal and non-metal may be used.

Figures 4, 5, 6:
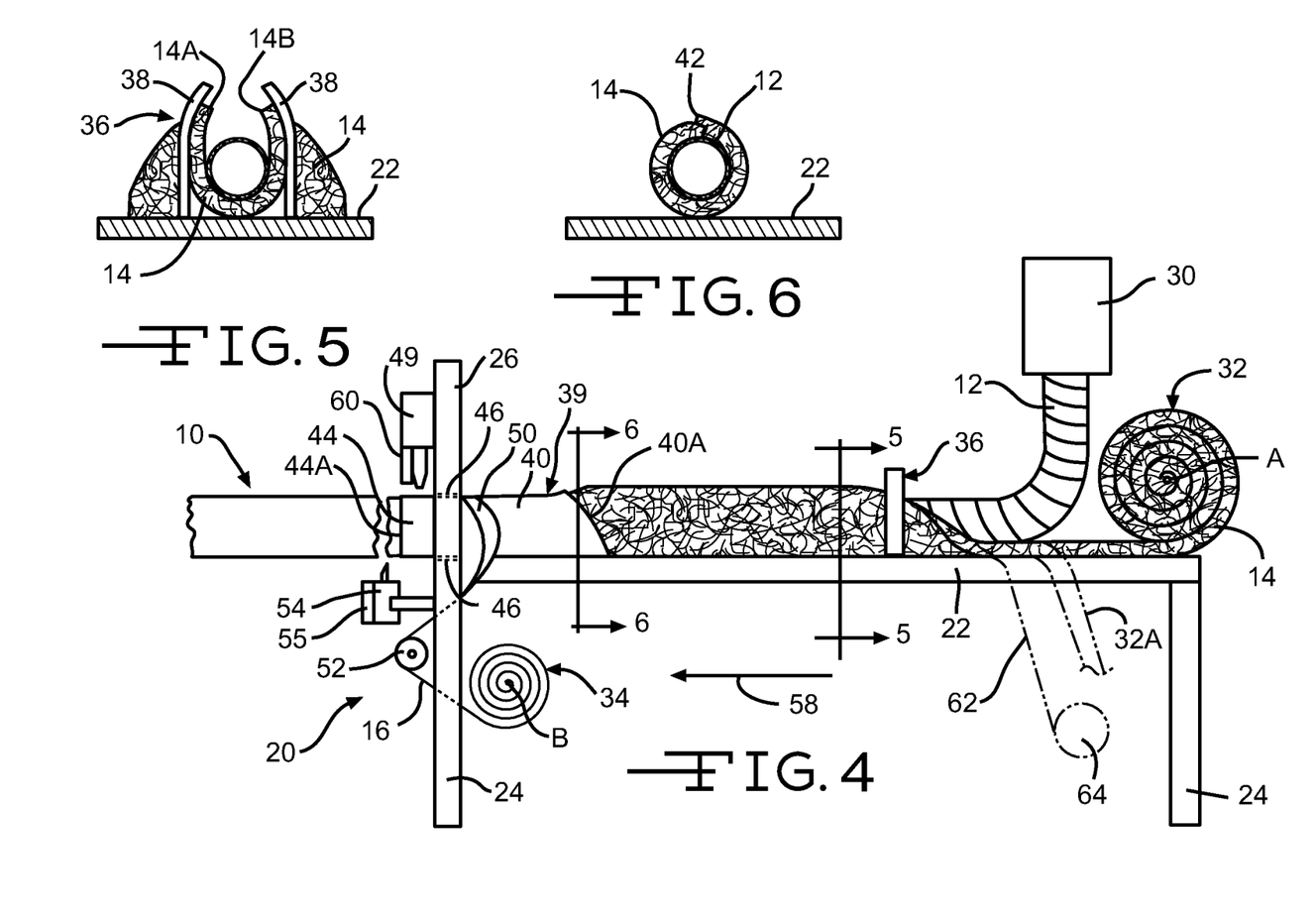
FIG. 4 is a schematic side elevational view of a first embodiment of a machine for manufacturing flexible insulated duct according to the method of the invention.
FIG. 5 is an enlarged cross-sectional view taken along the line 5-5 of FIG. 4.
FIG. 6 is an enlarged cross-sectional view taken along the line 6-6 of FIG. 4.
Figure 7:
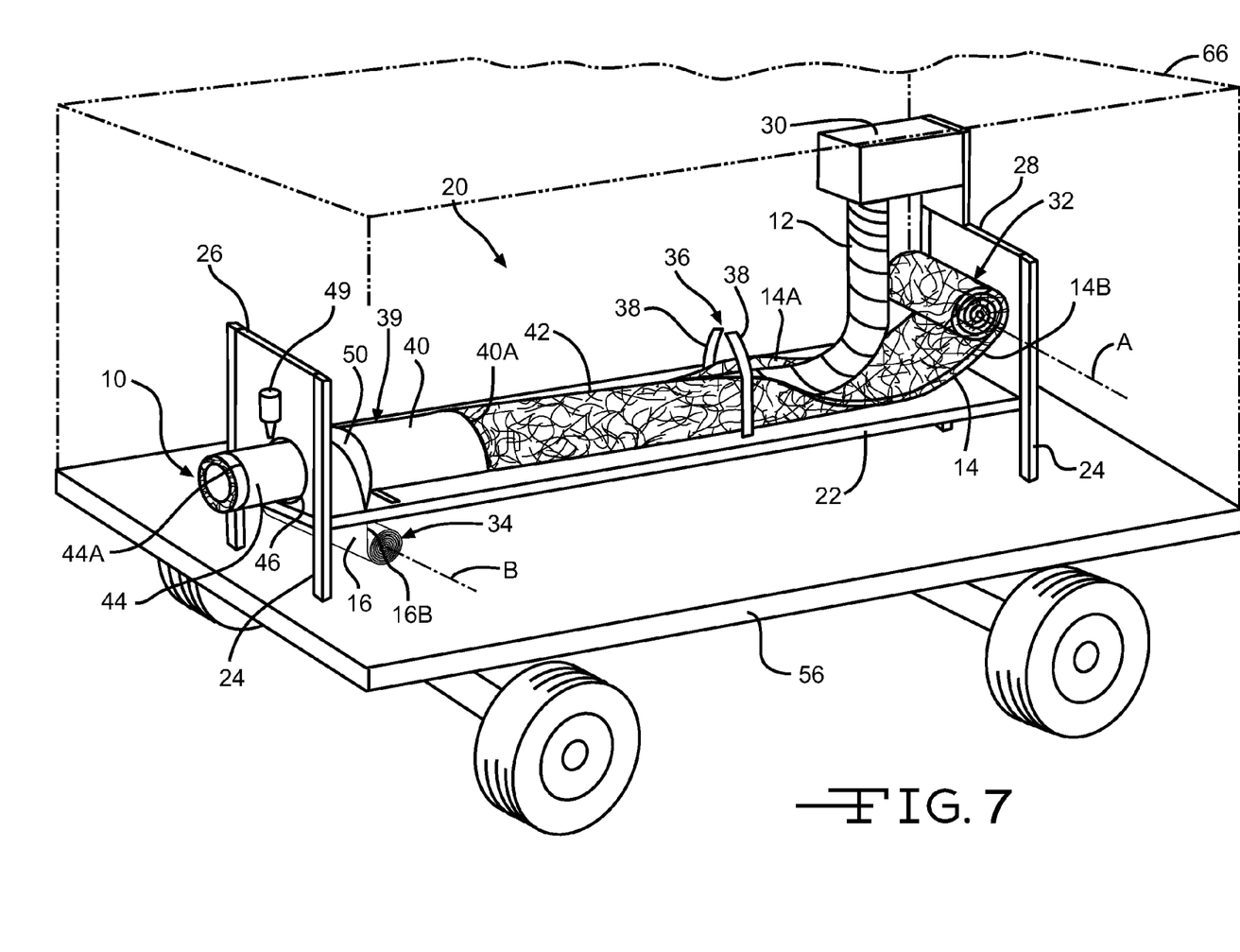
FIG. 7 is a schematic perspective view of a second embodiment of a machine for manufacturing flexible insulated duct according to the method of the invention, showing the machine mounted on a wheeled platform.

The machine 20 further includes a source of the inner core 12, shown schematically at 30, and a source 32 of the fibrous insulation 14. In the illustrated embodiment, the insulation 14 is provided in a roll 32. In FIG. 4, the roll of insulation 32 is shown rotatably mounted on the platform 22 about an axis A. Alternatively, the roll of insulation 32 may be disposed or mounted below the platform 22, as shown by the phantom line 32A. Additionally, the roll of insulation 32 may be disposed on or mounted to the second support member 28, as shown in FIG. 7.

If desired, a layer of scrim material, schematically illustrated by the phantom line 62 in FIG. 4, may be provided from a source of scrim material, schematically illustrated by the phantom line 64. The scrim material 62 may be positioned such that the scrim material 62 defines a strengthening and reinforcing layer between the insulation layer 15 and the outer layer 16. The scrim material 62 may be any desired material, such as fiberglass. Alternatively, the scrim material 62 may be formed from other desired material, such as polymers, non-polymers, and fabrics.

A source of the outer layer 16 is shown at 34 in FIG. 4. In the illustrated embodiment, the outer layer 16 is provided in a roll 34 rotatably mounted below the platform 22 about an axis B. A first machine member or first collar 36 extends outwardly from the platform 22 (upwardly when viewing FIGS. 4, 5, and 7). In the illustrated embodiment, the collar 36 includes a pair of arms 38 which urges or wraps the insulation 14 around a portion of the circumference of the inner core 12 and into a substantially U-shaped cross-section, as best shown in FIG. 5. A second machine member or second collar 39 includes a first portion 40 and a second portion 44. The illustrated second collar 39 is formed as an elongated tube having a first or inlet end 40A and a second or outlet end 44A. As shown in the illustrated embodiment, the second collar 39 extends through the support member 26.

The first portion 40 of the second collar 39 urges or wraps the insulation 14 into its final and substantially cylindrical shape, as shown in FIG. 2. The first portion 40 further wraps the insulation 14 such that longitudinal edges 14A and 14B of the insulation 14 overlap to define a longitudinally extending seam 42.

The second portion 44 extends outwardly of the first support member 26 (to the left when viewing FIGS. 4 and 7). A circular slot or opening 46 is formed in the support member 26 adjacent the OD of the second portion 44 of the collar 39. The opening 46 is concentric with the second portion 44 and defines a path for the outer layer 16. The outer layer 16 may be pulled through the opening 46 and disposed about the second portion 44. Alternatively, the first portion 40 and the second portion 44 may be formed as separate components.

In the illustrated embodiment, a forming member or shoe 50 is disposed between the roll 34 of the outer layer 16 and the second collar 39. The shoe 50 further defines a third machine member which disposes the outer layer 16 about the wrapped insulation 14 such that the longitudinal edges 16A and 16B of the outer layer 16 overlap to define a longitudinally extending seam 48. For example, as the outer layer 16 is moved or pulled between the shoe 50 and the second collar 39, the outer layer 16 is wrapped around the second collar 39 such that the longitudinal edges 16A and 16B of the outer layer 16 overlap to define the longitudinally extending seam 48. The outer layer 16 is then moved or pulled through the circular opening 46. Heat is then applied to the seam 48. A source of heat 49 is mounted to the platform 22 and directs heat at the longitudinally extending seam 48. Heat from the source of heat 49 bonds the overlapping longitudinal edges 16A and 16B together. A tension roll 52 may be provided on the platform 22 to provide tension to the outer layer 16.

A temperature sensor, schematically illustrated at 60, may be provided adjacent the seam 48. The sensor 60 may be positioned in any desired location so as to sense the temperature of the seam 48 of the outer layer 16 immediately after the overlapping longitudinal edges 16A and 16B of the outer layer 16 have been bonded by the source of heat 49. The temperature sensor 60 may include an a visual or audio indicator to indicate to an operator when the seam 48 in the outer layer 16 has failed to reach its desired temperature, such as when the outer layer 16 is being moved or pulled too quickly for the source of heat 49 to permanently bond the longitudinally extending seam 48.

Alternatively, other means may be used to bond the longitudinal edges 16A and 16B of the outer layer 16. For example, the longitudinal edges 16A and 16B may be bonded together by needling, stitching, adhesive, and tape, such as duct tape. Heat activated adhesive may also be applied to the longitudinal edges 16A and 16B of the outer layer 16, such that heat from the source of heat 49 bonds the overlapping longitudinal edges 16A and 16B together, as described above.

In the embodiment illustrated in FIG. 4, a first cutting member 54 is mounted to the platform 22 and cuts the flexible insulated duct 10 to a discrete length, as described below. The first cutting member 54 may be any desired cutting device such as a knife blade or a saw blade. Because the first cutting member 54 may not cut through the helix 12A, a second cutting member (not shown), such as a wire snip or wire cutter may be provided to cut the helix 12A of the inner core 12.

As shown in the exemplary embodiment illustrated in FIG. 7, the machine 20 is mounted on a wheeled platform 56 so as to be transportable. The illustrated wheeled platform 56 is a trailer. It will be understood however, that the machine 20 may be mounted on or within a truck or on or within any other desired vehicle. In another embodiment, the machine 20 may be mounted in a covered wheeled platform, such as shown by the phantom line 66 in FIG. 7, to protect the machine 20 from the elements.

In another alternate embodiment, the machine 20 may be mounted on a trailer 56 as described above, and one or more of the source of the inner core 30, the source of insulation 32, the source of the outer layer 34, and the source of scrim material 64 are mounted on a vehicle to which the trailer is attached.

Any component, such as the source of heat 49, that requires electrical power, may be powered by any desired source of power. For example, electrical power may be provided by the electrical supply in the vehicle in which the machine 20 is mounted or from which the vehicle is towed. Alternately, power may be supplied by a generator, a battery, or power source at a job site, such as a 110 volt power source.

The machine 20 is of sufficiently small size to be mounted on the wheeled platform 56. Advantageously, the machine 20 may be operated on the wheeled platform 56 without the need for the machine 20 to be dismounted to the ground or other surface.

Known machines for manufacturing flexible insulated duct are typically large and bulky and produce flexible insulated duct in predetermined long lengths, such as 25 feet long, which are then compressed, packaged, and sent to the customers. The known machines used for compressing the long lengths of flexible insulated duct are also relatively large and require significant space. Accordingly, known machines for manufacturing flexible insulated duct are too large and complicated to fit on a vehicle such as a truck, or to be otherwise transportable.

Referring again to FIGS. 4 and 7, the machine 20 for manufacturing flexible insulated duct 10 according to the method of the invention is illustrated. Generally, the illustrated manufacturing method involves wrapping an external surface of the inner core 12 with a layer of the fibrous insulation 14, thereby forming a layered assembly, and then wrapping the layered assembly with the outer layer 16.

In a first step of the manufacturing method, a roll 32 of the fibrous insulation 14 is provided. In the illustrated embodiment, the roll 32 includes fibrous insulation 14 having a single layer. The roll 32 may also be provided with multiple layers of insulation and may be provided in any desired length. In the illustrated embodiment, the fibrous insulation 14 has a width of about 1.0 to 2.0 inches larger than the circumference of the inner core 12, such that when the insulation 14 is wrapped around the inner core 12, the longitudinal edges 14A and 14B of the insulation 14 will overlap to define the longitudinally extending seam 42.

The fibrous insulation 14 may be positioned to unroll and lie substantially flat on the platform 22. The inner core 12 may then be extended from the source 30 and laid upon the insulation 14. The source 30 may provide the inner core 12 in any desired length. The insulation 14 and the inner core 12 may be jointly advanced in the direction of the arrow 58 through the collar 36, the collar 39, and the collar 44, until leading ends of the insulation 14 and the inner core 12 extend to an outlet end 44A of the collar 44.

As described above, as the insulation 14 and the inner core 12 are advanced through the collar 36, the pair of arms 38 urges or wraps the insulation 14 around a portion of the circumference of the inner core 12 and into a substantially U-shaped cross-section, as best shown in FIG. 5. As the insulation 14 and the inner core 12 are further advanced into and through the second collar 39, the collar 39 further urges or wraps the insulation 14 around the remaining portion of the circumference of the inner core 12 and into its final and substantially cylindrical shape, as shown in FIG. 2. The collar 39 further wraps the insulation 14 such that longitudinal edges 14A and 14B of the insulation 14 overlap to define the longitudinally extending seam 42.

The insulation 14 and the inner core 12 may be advanced manually by a machine operator, or by any desired structure, mechanism, device, such as a powered conveyer (not shown).

The outer layer 16 is directed from the roll 34 around the tension roll 52 and into engagement with the forming shoe 50. The shoe 50 directs the flat sheet of the outer layer 16 about the second collar 39 and into the circular opening 46.

The outer layer 16 may be directed or pulled through the opening 46 and disposed about the collar 44 such that longitudinal edges 16A and 16B of the outer layer overlap to define the longitudinally extending seam 48. The source of heat 49 directs heat, is mounted to the platform 22, and directs heat at the longitudinally extending seam 48. The heat bonds the overlapping longitudinal edges 16A and 16B together. In the illustrated embodiment, the heat is applied to the outer layer 16 such that the seam 48 is heated to a temperature within the range of from about 250 degrees F. to about 270 degrees F. It will be understood that the temperature of the heat produced by the source of heat 49 will vary depending on the melting or softening temperature of the material used to form the outer layer 16.

The outer layer 16 is advanced until an end of the outer layer 16 extends to the outlet end 44A of the collar 44. The outer layer 16 may be advanced manually by a machine operator, or by any desired structure, mechanism, device, such as powered conveyer (not shown).

Once the leading ends of the inner core 12 and the insulation 14 have been pulled within the collar 44 to a point just outside the end 44A of the collar 44 (to the left of the end 44A when viewing FIG. 4), and leading end of the outer layer 16 is pulled about the outer surface of the collar 44 to a point just outside the end 44A of the collar 44, the inner core 12, insulation 14, and outer layer 16 may be simultaneously pulled outward of the collar 44 in the direction of the arrow 58 (to the left of the end 44A when viewing FIG. 4). Such outward pulling of the inner core 12, insulation 14, and outer layer 16 positions the outer layer 16 around the layer of fibrous insulation 14, thereby forming the flexible insulated duct 10.

The flexible insulated duct 10 may then be directed or pulled outwardly in the direction of the arrow 58 and cut with first cutting member 54 to a desired discrete length. If required, the helix 12A of the inner core 12 may be cut with the second cutting member.

A measuring system 55 may be provided outside the end 44A of the collar 44 (to the left of the end 44A when viewing FIG. 4) to measure the lengths of the flexible insulated duct 10 being pulled outward of the collar 44. The measuring system may be any desired device for measuring the lengths of flexible insulated duct 10. For example, the measuring system 55 may include a position transducer, a length measuring sensor, a laser, a tape measure, and the like.

When a desired number of discrete lengths of flexible insulated duct 10 have been formed and cut, the wheeled platform 56 may be moved to another location, such as another job site, or a storage location.

Advantageously, and as shown in the illustrated embodiment, all of the disclosed steps may be accomplished manually by an operator, including pulling the flexible insulated duct 10 outward or the outlet end 44A.

It will be understood that an operator may first determine the desired length or lengths of the flexible insulated duct 10 needed at a job site. The operator may then form and cut at the job site the flexible insulated duct 10 having the desired length or lengths using the manufacturing method described in detail above. Once the desired number of discrete lengths of flexible insulated duct 10 have been formed and cut, the flexible insulated duct 10 may be installed in a building or structure at the job site.

The principle and mode of operation of the method and apparatus for manufacturing flexible duct have been described in its preferred embodiment. However, it should be noted that the method and apparatus for manufacturing flexible duct described herein may be practiced otherwise than as specifically illustrated and described without departing from its scope.

What is claimed is:

1. A method of manufacturing flexible insulated duct within a truck, the method comprising:
    providing a substantially flexible tubular core traveling in a longitudinal direction within the truck;
    providing a layer of insulation traveling in the same direction within the truck as the substantially flexible tubular core;
    passing the substantially flexible tubular core and the layer of insulation concurrently through a first collar within the truck, wherein the layer of insulation exits the first collar in a U-shape around the substantially flexible tubular core;
    passing the substantially flexible tubular core and the layer of insulation concurrently through a second collar within the truck, wherein each of two longitudinal edges of the layer of insulation overlap to form a seam within the second collar, the layer of insulation exits the second collar in a cylindrical-shape around the substantially flexible tubular core to form an insulated core, wherein the second collar is downstream from the first collar;

passing the insulated core downstream from the second collar;

passing the insulated core and a substantially flexible outer layer concurrently through a third collar within the truck, wherein each of two longitudinal edges of the outer layer overlap under a heat source to form a seam within the third collar, the substantially flexible outer layer exits the third collar in a cylindrical-shape around the insulated core, wherein the third collar is downstream from the second collar, thereby forming the flexible insulated duct within a truck; and cutting the flexible insulated duct within the truck to a discrete length.

2. The method according to claim 1, further comprising bonding the overlapping longitudinal edges of the longitudinally extending seam in the outer layer together.

3. The method according to claim 2, wherein the step of bonding includes applying heat to the longitudinally extending seam in the outer layer to bond the overlapping longitudinal edges together.

4. The method according to claim 3, wherein the heat is applied with hot air.

5. The method according to claim 4, wherein when the heat is applied to the outer layer, the longitudinally extending seam is heated to a temperature within the range of from about 250 degrees F. to about 270 degrees F.

6. The method according to claim 1, further including the step of measuring the flexible insulated duct to identify a desired length prior to the step of cutting.

7. The method according to claim 1, wherein the core includes a wire helix.

8. The method according to claim 7, wherein the wire helix is encapsulated in plastic film.

9. The method according to claim 8, wherein the wire helix includes spaced coils.

10. The method according to claim 1, wherein the insulation has a thickness within the range of from about 0.5 inches to about 2.0 inches.

11. The method according to claim 1, wherein the insulation has a width larger than a circumference of the core, such that when wrapped about the core, longitudinal edges of the insulation circumferentially overlap to define a longitudinally extending seam.

12. The method according to claim 1, wherein the outer layer has a width larger than a circumference of the layer of insulation.

13. The method according to claim 1, further comprising the step of wrapping a layer of scrim material between the layer of insulation and the outer layer.

14. A method of manufacturing flexible insulated duct within a truck at an installation site, the method comprising:

providing a substantially flexible tubular core traveling in a longitudinal direction within the truck;

providing a layer of insulation traveling in the same direction within the truck as the substantially flexible tubular core;

passing the substantially flexible tubular core and the layer of insulation concurrently through a first collar within the truck, wherein the layer of insulation exits the first collar in a U-shape around the substantially flexible tubular core;

passing the substantially flexible tubular core and the layer of insulation concurrently through a second collar within the truck, wherein each of two longitudinal edges of the layer of insulation overlap to form a seam within the second collar, the layer of insulation exits the second collar in a cylindrical-shape around the substantially flexible tubular core to form an insulated core, wherein the second collar is downstream from the first collar;

passing the insulated core downstream from the second collar;

passing the insulated core and a substantially flexible outer layer concurrently through a third collar within the truck, wherein each of two longitudinal edges of the outer layer overlap under a heat source to form a seam within the third collar, the substantially flexible outer layer exits the third collar in a cylindrical-shape around the insulated core, wherein the third collar is downstream from the second collar, thereby forming the flexible insulated duct;

cutting the flexible insulated duct within the truck to a discrete length; and installing the flexible insulated duct.

15. The method according to claim 14, further including the step of measuring the flexible insulated duct to identify a desired length prior to the step of cutting.

16. The method according to claim 14, further including the step of bonding the overlapping longitudinal edges of the longitudinally extending seam in the outer layer together, thereby forming the flexible insulated duct.

17. The method according to claim 16, wherein the step of bonding includes applying heat to the longitudinally extending seam in the outer layer to bond the overlapping longitudinal edges together.

18. The method according to claim 17, wherein the heat is applied with hot air.

19. The method according to claim 14, wherein the outer layer has a width larger than a circumference of the layer of insulation.

20. The method according to claim 14, wherein the core includes a wire helix.

21. The method according to claim 20, wherein the wire helix is encapsulated in plastic film.

22. The method according to claim 21, wherein the wire helix includes spaced coils.

23. The method according to claim 14, wherein the insulation has a width larger than a circumference of the core, such that when wrapped about the core, longitudinal edges of the insulation circumferentially overlap to define a longitudinally extending seam.

24. The method according to claim 14, further comprising the step of wrapping a layer of scrim material between the layer of insulation and the outer layer.

25. A method of manufacturing flexible insulated duct within a truck, the method comprising:

providing a tubular core traveling in a longitudinal direction within the truck;

providing a layer of insulation traveling in the same direction within the truck as the tubular core;

passing the tubular core and the layer of insulation concurrently through a first collar within the truck, wherein the layer of insulation exits the first collar in a U-shape around the tubular core;

passing the tubular core and the layer of insulation concurrently through a second collar within the truck, wherein each of two longitudinal edges of the layer of insulation overlap to form a seam within the second collar, the tubular core and the layer of insulation exit the second collar assembled as an insulated core, with the layer of insulation in a cylindrical-shape around the tubular core;

passing the insulated core downstream from the second collar;

passing the insulated core and an outer layer concurrently through a third collar within the truck, wherein longitudinal edges of the outer layer are circumferentially wrapped about the layer of insulation under a heat source and within the third collar to overlap and define a longitudinally extending seam extending circumferentially about the insulated core;

bonding the overlapping longitudinal edges of the longitudinally extending seam in the outer layer together within the truck.

26. The method according to claim 25, wherein the step of bonding the overlapping edges of the outer layer occurs within the third collar.

27. The method according to claim 26, wherein the step of bonding includes applying heat to the longitudinally extending seam in the outer layer with hot air.

* * * * *